United States Patent
Tsai et al.

(10) Patent No.: US 12,120,540 B2
(45) Date of Patent: Oct. 15, 2024

(54) SMART CHANNEL SWITCHING METHOD BASED ON HISTORY CHANNEL DATA, AND TERMINAL DEVICE AND READABLE STORAGE MEDIUM THEREOF

(71) Applicant: D-LINK CORPORATION, Taipei (TW)

(72) Inventors: Ming-Chang Tsai, Taipei (TW); Ting-Wei Liu, Taipei (TW)

(73) Assignee: D-Link Corporation, Taipei (TW)

( * ) Notice: Subject to any disclaimer, the term of this patent is extended or adjusted under 35 U.S.C. 154(b) by 380 days.

(21) Appl. No.: 17/672,055

(22) Filed: Feb. 15, 2022

(65) Prior Publication Data
US 2023/0224735 A1    Jul. 13, 2023

(30) Foreign Application Priority Data
Jan. 7, 2022    (TW) .................................. 111100825

(51) Int. Cl.
*H04W 24/08*    (2009.01)
*H04L 1/00*    (2006.01)
*H04W 28/22*    (2009.01)

(52) U.S. Cl.
CPC ........... *H04W 24/08* (2013.01); *H04L 1/0003* (2013.01); *H04W 28/22* (2013.01)

(58) Field of Classification Search
CPC .... H04W 24/08; H04W 28/22; H04L 1/0003; H04L 1/002
See application file for complete search history.

(56) References Cited

U.S. PATENT DOCUMENTS

| | | | | |
|---|---|---|---|---|
| 2008/0317014 A1* | 12/2008 | Veselinovic | .......... | H04L 1/0001 370/380 |
| 2009/0196173 A1* | 8/2009 | Wang | .................... | H04W 72/52 370/230 |
| 2015/0312910 A1* | 10/2015 | Damodaran | .......... | H04W 28/20 370/329 |
| 2019/0230422 A1* | 7/2019 | Hajimusa | ............... | H04W 76/15 |
| 2020/0244970 A1* | 7/2020 | Chen | .................. | H04N 19/154 |
| 2022/0337306 A1* | 10/2022 | Xing | .................... | H04B 7/0888 |
| 2023/0128650 A1* | 4/2023 | Haas | ..................... | H04B 17/318 |

* cited by examiner

*Primary Examiner* — Deepa Belur
(74) *Attorney, Agent, or Firm* — Rosenberg, Klein & Lee

(57) ABSTRACT

A smart channel switching method based on history channel data, and its terminal device and readable storage medium are disclosed. The method includes the steps of: capturing a history current noise value or transmission capacity of each channel of a wireless device and obtaining a healthrate of the channel; obtaining a health ratio by the transmission quantity of each channel and the corresponding healthrate; comparing the health ratio with a threshold, and switching the connection of the wireless device to a channel with the health ratio below the threshold when the health ratio reaches the threshold. In this way, this invention obtains a health ratio by the history current noise value or transmission capacity of each channel, compares the health ratio with the threshold to determine whether the transmission capacity is sufficient, and switches a channel accordingly without requiring any change of the communication protocol.

7 Claims, 3 Drawing Sheets

FIG.2A

Channel 36: 1.30 | 1.32 | 4.49 | 4.44 | 3.90 | 3.98 | 4.79 | 4.87 — Now, Tnow

FIG.2B

Channel 36: 1.30 | 1.32 | 4.49 | 4.44 | 3.90 | 3.98 | 4.79 | 4.87 | 4.4 — Now, Tnow SMART CHANNEL SWITCHING METHOD
BASED ON HISTORY CHANNEL DATA, AND
TERMINAL DEVICE AND READABLE
STORAGE MEDIUM THEREOF

FIELD OF THE INVENTION

The present invention relates to a smart channel switching method based on history channel data, and its terminal device and readable storage medium, and more particularly to the smart channel switching method that uses a history current noise value or transmission capacity of each channel of a wireless device to calculate a health ratio, and determines whether or not to switch a channel according to the condition that the health ratio has reached the threshold.

BACKGROUND OF THE INVENTION

In general, the selection of channels for conventional routers is limited to a user's designation or a confirmation of channel congestion after turning on the routers, so as to determine the availability of a certain channel and select the channel accordingly.

For example, the automatic channel selection algorithm of Mediatek (MTK) chips adopts the method of searching and collecting the cleanliness of each channel per unit time, and the main strategy of this method is to select a channel according to the number of wireless base stations and the interference status or according to the determined number of idle channels and the intensity of wireless received signals.

The automatic channel selection algorithm of RealTek chips also adopts the method of searching and collecting the characteristic signal of each channel per unit time, so that if a clean channel exists, and there is no overlapped channel in a wireless base station, then a function find_clean_channel ( ) will be used to select a clean channel. If the channel is not clean, the streaming environment will be determined first, wherein a streaming is determined by the value of a rx_count of packets, and if the value of the rx_count is greater than the MAC_RX_COUNT_THRESHOLD, it will be determined that the channel has high traffic, and the cca value of the channel (for determining whether or not the channel is idle) and the rx_count value will be counted. If the rx_count is not greater than the MAC_RX_COUNT_THRESHOLD, it will be determined that the channel does not have high traffic, and the weight of the rx_count will be counted into their score, and the number of wireless base stations on each channel will be counted, and the weight of the number of wireless base stations on each channel and the wireless received signal intensity of the channel where the wireless base station is located will be allocated with different weights.

The automatic channel selection algorithm of BRCM chips also adopts the method of searching and collecting the characteristic signal of each channel and the cleanliness of each channel once every three hours. In the channel selection period, an Auto Channel Selection (ACS) algorithm is used to execute the following steps, wherein an acs_select_chspeco (with the strategy of using a method similar to that of the Realtek chips to perform the ACS function) is mainly used, and an acs_pick_chanspeco (with other strategies similar to that of the MTK chips) are also used to perform the ACS function. In this way, after switching to a new channel, the algorithm switches the status of ACS back to the detection status, and waits for the next trigger time to evaluate the weight again, instead of using the long history record data as a basis for the immediate switch of the channel.

Therefore, the current practice is based on a fixed time set by users to optimize and switch the channel. However, the wireless connection environment will vary with time in the current practice, so that the conventional channel selection method cannot immediately determine whether there is a large transmission quantity around, or whether there are other unidentifiable noise sources, in order to optimize or switch the channel, thereby affecting the smoothness of connecting a user's wireless connection device.

Most of the conventional channel switching technologies are applied to wide-area wireless communication devices (such as 3G and 4G) to change the communication protocol of their physical layers or data exchange, so as to reduce the environmental factors of channel switching or the technology of the transmission data layer.

However, the existing technologies are mainly used in wide-area wireless devices such as communication units of mobile phones, or CPUs of their chips. When the environmental factor changes, the communication protocol of the current searched and collected parameters is changed, and the unit energy at N time points are obtained from a hopping sequence and determined by a processing unit according to the average energy and misjudgment probability to determine whether or not the subsequent signal is a noise, so as to increase the available bandwidth capacity on the channel. However, this mechanism is too complicated and unable to be applied to various wireless devices, thereby incurring a higher R&D cost.

In view of the aforementioned drawbacks of the prior art, the inventor of the present invention based on years of experience in the related industry to conduct extensive research and experiment, and finally provided a smart channel switching method based on history channel data in accordance with the present invention to overcome the drawbacks of the prior art.

SUMMARY OF THE INVENTION

Therefore, the primary objective of the present invention is to providing a smart channel switching method based on history channel data to overcome the aforementioned drawbacks of the prior art.

To achieve the aforementioned and other objectives, the present invention discloses a smart channel switching method based on history channel data, which is loaded into a device to execute the following steps, and the method includes: capturing a history current noise value of each channel of a wireless device, and obtaining a channel healthrate according to the history current noise value; obtaining a health ratio by the current channel healthrate and the best channel healthrate; and comparing the health ratio with a threshold, and switching the connection of the wireless device to another channel if the health ratio reaches the threshold.

The aforementioned smart channel switching method based on history channel data further includes the steps of: calculating an allowable transmission capacity of each channel according to the current noise value; obtaining a maximum transmission quantity of the wireless device; and calculating a channel healthrate according to the transmission capacity and the maximum transmission quantity.

In the aforementioned smart channel switching method based on history channel data, the transmission capacity is a modulation and coding scheme (MCS) data rate corresponding to the current noise value in a current signal-to-noise ratio of the channel.

In the aforementioned smart channel switching method based on history channel data, the maximum transmission quantity is a modulation and coding scheme (MCS) data rate of the wireless device corresponding to a maximum noise value in a maximum signal-to-noise ratio of the channel.

In the aforementioned smart channel switching method based on history channel data, the current signal-to-noise ratio is equal to a predetermined signal-to-noise ratio of the wireless device in its corresponding channel deducting a difference of the current noise value minus a minimum noise value of the wireless device, and plus a current equivalent isotropically radiated power (EIRP).

The aforementioned smart channel switching method based on history channel data further includes the steps of: defining a trigger value; regularly capturing a history current noise value of each channel of the wireless device, and calculating a health ratio thereof, and switching the connection of the wireless device to a channel with a health ratio below the threshold by the wireless device, if the number of times of the health ratio consecutively reaching the threshold matches with the trigger value.

In the aforementioned smart channel switching method based on history channel data, the wireless device switches the connection thereof to a channel with a health ratio below the threshold, when the health ratio reaches the threshold.

The present invention further provides a smart channel switching method based on history channel data, which is loaded into a device to execute the following steps, and the method includes: capturing a history allowable transmission capacity of each channel of the wireless device, and obtaining a channel healthrate according to the history allowable transmission capacity; obtaining a health ratio by the current channel healthrate and the best channel healthrate; and comparing a threshold with the health ratio, and switching the connection of the wireless device to a channel with a health ratio below the threshold by the wireless device, when the health ratio reaches the threshold.

The present invention further provides a terminal device, including: a processor and at least one storage device, and the storage device stores an instruction, which is executed by the processor to implement the aforementioned smart channel switching method based on history channel data.

The present invention further provides a readable storage medium that stores at least one instruction, and when the at least one instruction is executed, the smart channel switching method based on history channel data will be implemented.

In summation of the description and configuration above, the present invention obviously has the following advantageous effects:

The smart channel selection method of this invention can be applied to wireless base stations including the wireless control units and the wireless extenders, and if a certain channel is shared by other wireless devices in a certain period of time, or a certain wireless device occupies most of the transmission time and bandwidth, the method will selectively switch the channel to a relatively clean one, so that the method of this invention just needs to determine the health ratio of each channel by the threshold according to history current noise value or transmission capacity and use the health ration as a basis to determine whether or not to switch the connection channel, and determine whether the transmission capacity is sufficient, without requiring any change of physical properties and the wireless communication standard of the data layer. The trigger value can be used for setting and determination, such that the regularly captured history health ratio can be used as a basis of switching the channel. In this way, the present invention can automatically select a smoother channel and optimize the connection of a user's wireless connection device and the transmission efficiency.

BRIEF DESCRIPTION OF THE DRAWINGS

FIG. 2A is a schematic view of an exemplary embodiment of a channel 36 with a history threshold in accordance with the present invention, wherein the number of times of reaching the threshold has not reached a trigger value;

FIG. 2B is a schematic view of an exemplary embodiment of a channel 36 at with a history threshold in accordance with the present invention, wherein the number of times of reaching the threshold has not reached a trigger value.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
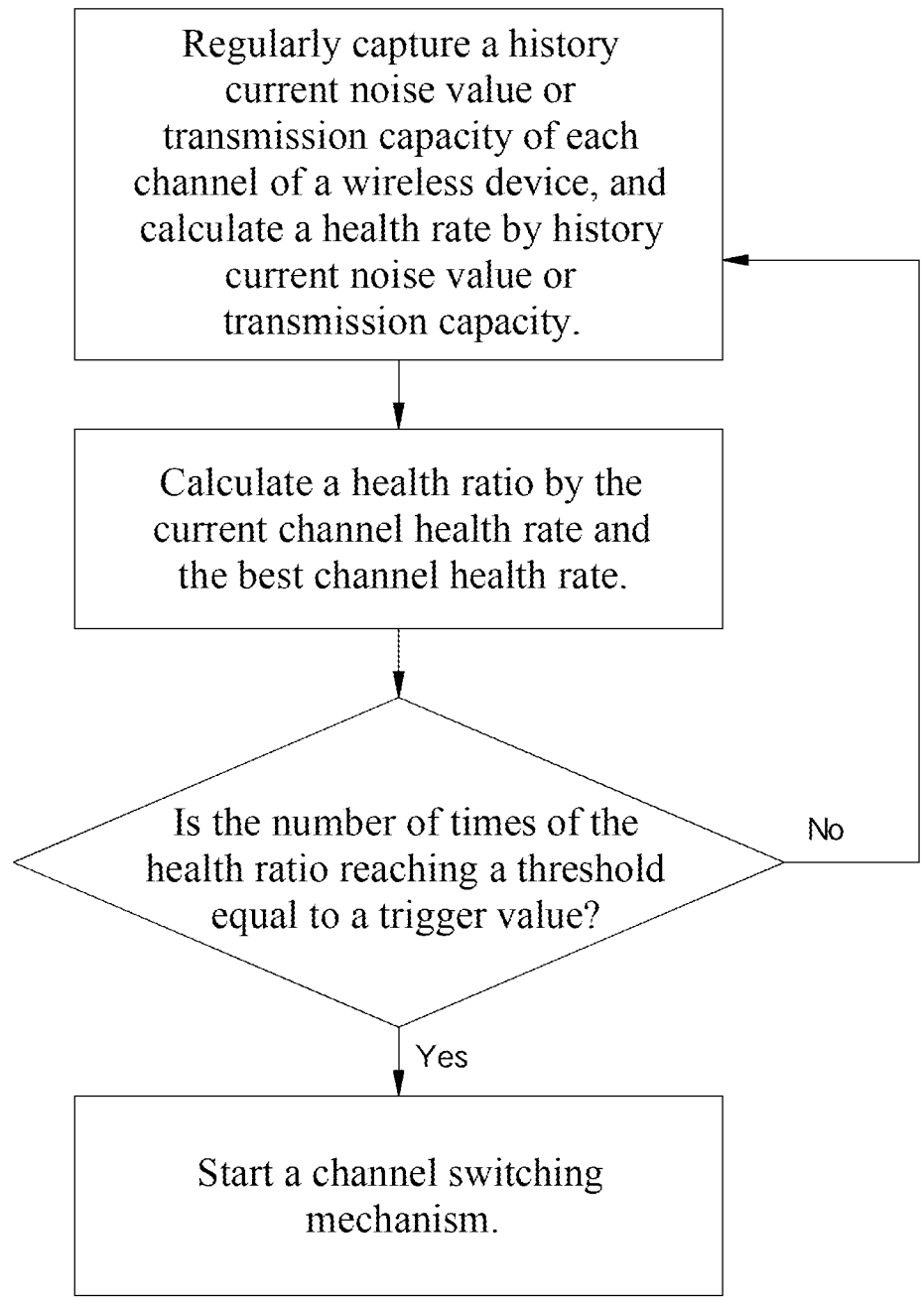
FIG. 1 is a flow chart of the present invention.

With reference to FIG. 1 for a smart channel switching method based on history channel data in accordance with the present invention, the method is loaded into a device to execute the following steps, and the device of the present invention is a terminal device with a processor and at least one storage device, and the storage device stores an instruction, and the instruction is executed by the processor to carry out its procedure, or a readable storage medium is provided for storing at least one instruction, and the at least one of the instructions can be executed by the device to carry out its procedure. Wherein, the device includes a computer and wireless base station including but not limited to a router, a wireless control unit or a wireless extender. The smart channel switching method based on history channel data in accordance with the present invention includes the following steps:

S001: Capture a history current noise value of each channel of a wireless device, and use the history current noise value to obtain a healthrate of the channel, wherein the wireless device is the aforementioned device, and the current noise value NHM (Noise Histogram Measurement) (dBm) is returned by the wireless device, and then captured and stored in the history of the channel.

In an embodiment of calculating the healthrate, an allowable transmission capacity of each of the channels is calculated according to the current noise value, and a healthrate of the channel is calculated according to the transmission capacity. Specifically, the method of the present invention obtains an equivalent isotropically radiated power (EIRP) gain ($CH\_EIRP_{gain}$) by the EIRP of the wireless device as shown in the Mathematical Formula 1 below:

$$CH\_EIRP_{gain} = CH\_EIRP - CH\_EIRP_{min} \quad \text{[Mathematical Formula 1]}$$

wherein, CH_EIRP is the maximum EIRP of each channel according to the specifications of countries or regions, wherein the gain of an antenna can be taken into account if needed; the $CH\_EIRP_{min}$ is minimum EIRP of each channel according to the specifications of different countries or regions, such as minimum EIRP of a dynamic frequency selection (DFS) channel equal to 24 dBm in the United and the minimum EIRP of an indoor channel equal to 20 dBm in the European Union. In the 2.4 GHz channels, the first and last channels also have a control of transmission power (Tx Power) at a band edge; and Mathematical Formula 1 expresses that the $CH\_EIRP_{gain}$ of a certain channel is equal to the EIRP of the channel minus its background distraction.

The maximum value of the maximum signal-to-noise ratio $SNR_{5G,max}$ of the wireless device is given in the Mathematical Formula 2 below:

$$SNR_{5G,max} = SNR_{def5G} + CH\_EIRP_{gain,max} \quad \text{[Mathematical Formula 2]}$$

wherein, $SNR_{def5G}$ is a predetermined signal-to-noise ratio of the wireless device in the channel, which is available from the wireless chip data provided by the wireless device manufacturer, wherein the standard signal-to-noise ratio (Standard SNR) is usually set as $SNR_{def2.4G} = 18$ dBm, $SNR_{def5G} = 28$ dBm, and its value generally depends on the circuit board of the wireless device. Assumed that the $SNR_{def5G}$ using the 256QAM baseband modulation under the modulation and coding scheme (MCS) index MCS9, its predetermined signal-to-noise ratio $SNR_{def}$ is 28 dBm; and the MCS indexes are provided by the wireless device manufacturer or the manufacturer who uses the chip, which is shown in Table 1 below:

TABLE 1

20 MHz 802.11ax Wi-Fi 6 MCS indexes

| MCS | Modulation | Bit | Code Rate | SNR | bps/Hz |
|---|---|---|---|---|---|
| 0 | BPSK | 1 | 1/2 | 3 | 0.5 |
| 1 | QPSK | 2 | 1/2 | 6 | 1 |
| 2 | QPSK | 2 | 3/4 | 8 | 1.5 |
| 3 | 16QAM | 4 | 1/2 | 11 | 2 |
| 4 | 16QAM | 4 | 3/4 | 15 | 3 |
| 5 | 64QAM | 6 | 1/2 | 21 | 4 |
| 6 | 64QAM | 6 | 3/4 | 20 | 4.5 |
| 7 | 64QAM | 6 | 5/6 | 21 | 5 |
| 8 | 256QAM | 8 | 3/4 | 26 | 6 |
| 9 | 256QAM | 8 | 5/6 | 28 | 6.67 |
| 10 | 1024QAM | 10 | 3/4 | 31 | 7.5 |
| 11 | 1024QAM | 10 | 5/6 | 33 | 8.33 |

In this embodiment, $SNR_{def5G} = 28$ dBm; $CH\_EIRP_{gain,max}$ is the maximum value of $CH\_EIRP_{gain}$ obtained from the Mathematical Formula 1.

At this time, the current signal-to-noise ratio $SNR_{5G}$ can be derived from the Mathematical Formula 3 below:

$$SNR_{5G} = SNR_{def5G} - (NHM - NF_{min,def5G}) + CH\_EIRP_{gain} \quad \text{[Mathematical Formula 3]}$$

Wherein, $NF_{min,def5G}$ is the minimum noise value provided by wireless device manufacturer, and its value is generally pre-set as $NF_{min,def2.4G} = -88$ dBm, $NF_{min,def5G} = -95$ dBm, and its value generally depends on the circuit board or chipset of the wireless device; and the NHM is the history current noise value of each channel as described above.

In Table 1, the obtained SNR can be used to derive the current MCS value, and the maximum $MCS_{max}$ value of the maximum signal-to-noise ratio $SNR_{max}$. After the MCS value and the $SNR_{max}$ value are obtained, the data rate (Data_Rate) and the maximum transmission quantity (Data_Rate$_{SNRmax}$) can be found according to their communication protocols, and the finding method is a well-known art and thus will not be repeated here. In addition, the data rate (Data_Rate$_{SNR}$) of the current noise value NHM at the current signal-to-noise ratio $SNR_{5G}$ of the channel can be represented as its transmission capacity.

Therefore, the healthrate is a ratio of the transmission capacity to the transmission quantity as given in the Mathematical Formula 4 below:

$$\text{HealthRate} = (\text{Data\_Rate}_{SNR} / \text{Data\_Rate}_{SNRmax}) \quad \text{[Mathematical Formula 4]}$$

The channel remaining throughput can be defined as a product of the current data rate (Data_Rate$_{SNR}$) and the channel busy ratio corresponding to the wireless device, wherein the busy ratio (Channel Loading Measurement, CLM) (%) is obtained from the information returned by the wireless device.

In another embodiment, the present invention can return the transmission capacity from the wireless device and the transmission capacity is converted into the healthrate. However, such arrangement is just an example and this invention is not limited by such arrangement only.

S002: The health rates of all channels can be obtained by the above step. The closer the value of the healthrate to 1, the better the healthrate. The current channel healthrate and the best channel healthrate can be used to obtain a health ratio (also known as a recommended level) and its value falls between a range of 0~100%, which can be expressed by the Mathematical Formula 5 below:

health ratio=Best Channel Healthrate/Current Channel Healthrate  [Mathematical Formula 5]

S003: Compare the health ratio with a threshold, and start the channel switching mechanism when the health ratio has reached the threshold, so that the wireless device is switched to a channel with the health ratio that has not reached the threshold.

In a specific embodiment, the condition of the health ratio reaching the threshold is defined by the Mathematical Formula 6 below:

[Mathematical Formula 6]

$$\frac{\text{Best Channel Healthrate}}{\text{Current Channel Healthrate}} > \text{Threshold}$$

According to the Mathematical Formula 6, the threshold must be set to be greater than 1, indicating that the bandwidth of the current channel is insufficient for transmission, and thus the channel switching mechanism must be started to switch the connected channel to a channel with a wider bandwidth.

S004: Switch the channel when other wireless devices share this channel or a certain wireless device occupies most of the transmission time and bandwidth in order to correctly determine that the bandwidth of the channel is insufficient, instead of a temporary factor. In a preferred embodiment, a trigger value is defined, and a history current noise value of each channel of the wireless device is captured regularly. As described above, the health ratio is calculated. While continuously determining whether the health ratio has reached threshold, if the number of times the health ratio has reached the threshold matches with the trigger value, it can be determined that the current connected channel has a health ratio greater than the threshold at the time, and thus the bandwidth at that time is insufficient, so that the channel is switch.

Results of a specific experiment of the present invention are listed in Table 2 below, which show the history data of the wireless device at eight consecutive time points.

TABLE 2

| Channel | Wideband | | | | | | | |
|---|---|---|---|---|---|---|---|---|
| | Data 1 | Data 2 | Data 3 | Data 4 | Data 5 | Data 6 | Data 7 | Data 8 |
| 36 | 160 | 178 | 180 | 205 | 201 | 167 | 164 | 200 |
| 52 | 433 | 455 | 423 | 412 | 422 | 450 | 480 | 442 |
| 100 | 644 | 656 | 664 | 643 | 678 | 652 | 665 | 674 |
| 116 | 592 | 600 | 578 | 584 | 546 | 593 | 586 | 588 |
| Maximum Transmission Quantity | 800 | 800 | 800 | 800 | 800 | 800 | 800 | 800 |

At this time, the threshold is set as 1.33. Assumed that the initial connected channel is 36, and each record of sampling time frequency is 30 seconds. In an embodiment of the present invention, a sliding window of a user interface is used to inquire history data and determine whether the health ratio has reached the threshold within a fixed time. In this embodiment, the trigger value is set to 7. In other words, if the health ratio of one of the channels has reached the threshold for a consecutive number of times greater than 7, then the channel switching mechanism will be started.

In the initial status as shown in FIG. 2A, only six consecutive records indicating that the health ratio has reached the threshold, so that the channel switching mechanism is not started. As time progresses to another time point as shown in FIG. 2B, the number of times of the health ratio reaching the threshold has reached the set trigger value, so that the channel switching mechanism will be started.

Figure 3:
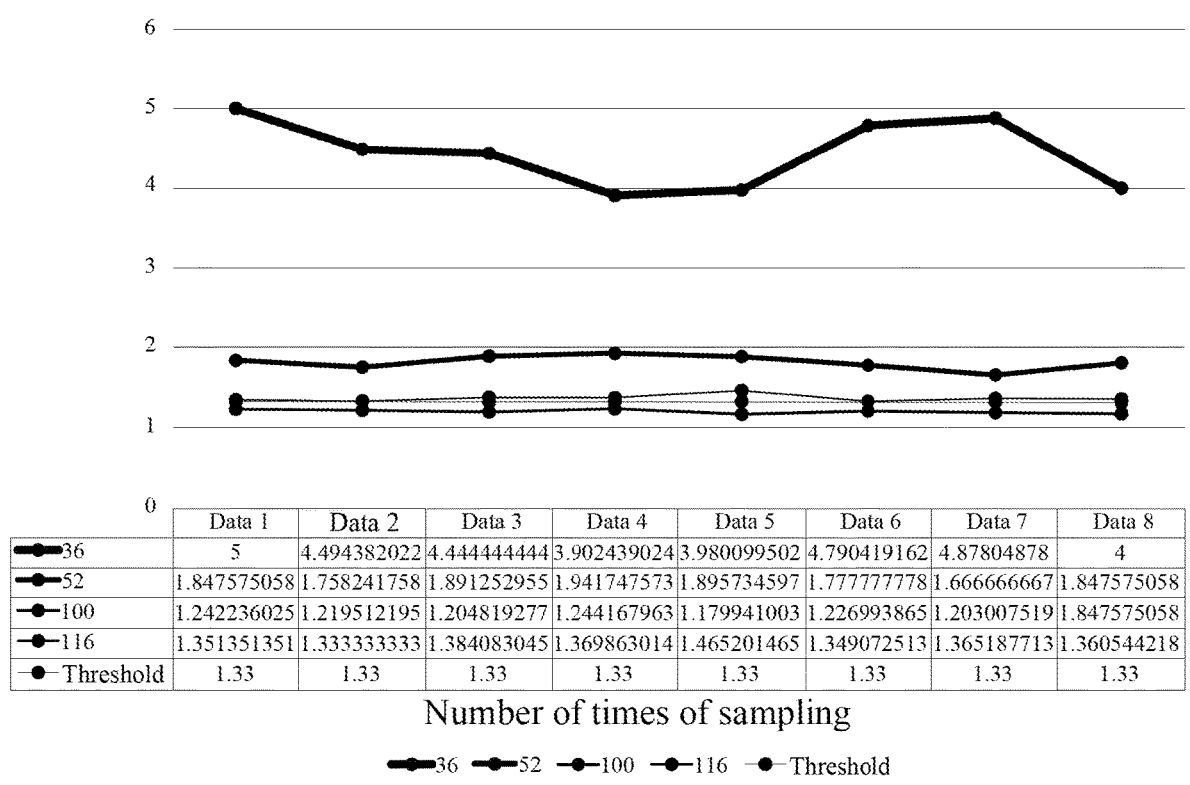
FIG. 3 is a line graph of an exemplary embodiment of a health ratio of each current channel versus a threshold in accordance with the present invention.

With reference to FIG. 3 for a line graph of an exemplary embodiment of a health ratio of each channel versus a threshold in accordance with the present invention, the history health ratios of the channel 100 are lower than the threshold, so that the connected channel is switched to channel 36.

Obviously, the present invention can be applied directly to present existing wireless devices without requiring any change of the communication protocol, and the wireless device manufacturer or the chip manufacturer is requested to provide or return the related information including CH_E-IRP$_{min}$, NF$_{def5G}$, NF$_{def2.4G}$, MCS, NF$_{min,def5G}$, NF$_{min,def2.4G}$, Data_Rate$_{SNRmax}$ to carry out the algorithm of the invention and start the channel switching mechanism, so as to achieve the effects of automatically selecting a smoother channel, and optimizing the connection and transmission efficiency of the user's wireless connection device.

What is claimed is:

1. A smart channel switching method based on history channel data, loaded by a device before executing the following steps, and the method comprising:

capturing a history current noise value of each channel of a wireless device, and obtaining a channel healthrate according to the history current noise value;

obtaining a health ratio by the current channel healthrate and the best channel healthrate, calculating an allowable transmission capacity of each channel according to the current noise value, said allowable transmission capacity is a modulation and coding scheme (MCS) data rate corresponding to the current noise value in a current signal-to-noise ratio of the channel, wherein the current signal-to-noise ratio is equal to a predetermined signal-to-noise ratio of the wireless device in its corresponding channel deducting a difference of the current noise value minus a minimum noise value of the wireless device, and plus a current equivalent isotropically radiated power (EIRP), obtaining a maximum transmission quantity of the wireless device calculating a channel healthrate according to the transmission capacity and the maximum transmission quantity, comparing the health ratio with a threshold, and switching the connection of the wireless device to another channel if the health ratio reaches the threshold.

2. The smart channel switching method based on history channel data according to claim 1, wherein the maximum transmission quantity is a modulation and coding scheme (MCS) data rate of the wireless device corresponding to a maximum noise value in a maximum signal-to-noise ratio of the channel.

3. The smart channel switching method based on history channel data according to claim 1, wherein the wireless device switches the connection of a current channel to a channel with a health ratio below a predetermined threshold when a threshold of the current channel is reached.

4. The smart channel switching method based on history channel data according to claim 1, further comprising the steps of:

defining a trigger value;

regularly capturing a history current noise value of each channel of the wireless device, and calculating a health ratio thereof; and switching the connection of the wireless device to a channel with a health ratio below the threshold by the wireless device, if the number of times of the health ratio consecutively reaching the threshold matches with the trigger value.

5. A smart channel switching method based on history channel data, loaded by a device before executing the following steps, and the method comprising:

capturing a history allowable transmission capacity of each channel of the wireless device, wherein a maximum transmitted quantity is a modulation and coding scheme (MCS) data rate of the wireless device corresponding to a maximum noise value in a maximum signal-to-noise ratio of each channel, said signal-to-noise ratio of each channel being equal to a predetermined signal to a noise ratio of the wireless device in each channel deducting a difference of a current noise value minus a minimum noise value of the wireless device and plus a current equivalent isotropically radiated power, and obtaining each channel healthrate according to the history allowable transmission capacity;

obtaining a health ratio by the current channel healthrate and the best channel healthrate; and comparing a threshold with the health ratio, and switching the connection of the wireless device to a channel with a health ratio below the threshold by the wireless device, when the health ratio reaches the threshold.

6. A terminal device, comprising:
a processor and at least one storage device, and the storage device storing an instruction, which is executed by the processor, said processor configured to implement the smart channel switching method based on history channel data according to the claim 1.

7. A non-transitory readable storage medium, that stores at least one instruction therein, a processor for executing the at least one instruction, said processor configured to switch a channel based on history channel data according to claim 1.

* * * * *